US009778957B2

(12) United States Patent
Colson et al.

(10) Patent No.: US 9,778,957 B2
(45) Date of Patent: Oct. 3, 2017

(54) SYSTEMS AND METHODS FOR INTELLIGENTLY DISTRIBUTING TASKS RECEIVED FROM CLIENTS AMONG A PLURALITY OF WORKER RESOURCES

(71) Applicant: Stitch Fix, Inc., San Francisco, CA (US)

(72) Inventors: Eric C. Colson, Los Gatos, CA (US); Bradley J. Klingenberg, San Mateo, CA (US); Jeffrey S. Magnusson, Half Moon Bay, CA (US); W. Joel Strait, San Francisco, CA (US); Jason B. Martin, Lafayette, CA (US)

(73) Assignee: STITCH FIX, INC., San Francisco, CA (US)

( * ) Notice: Subject to any disclaimer, the term of this patent is extended or adjusted under 35 U.S.C. 154(b) by 0 days.

(21) Appl. No.: 14/674,622

(22) Filed: Mar. 31, 2015

(65) Prior Publication Data
US 2016/0292011 A1    Oct. 6, 2016

(51) Int. Cl.
*G06F 9/50* (2006.01)

(52) U.S. Cl.
CPC .......... *G06F 9/5044* (2013.01); *G06F 9/5027* (2013.01); *G06F 2209/501* (2013.01); *G06F 2209/5018* (2013.01); *G06F 2209/548* (2013.01)

(58) Field of Classification Search
CPC .................................................. G06F 9/5044
See application file for complete search history.

(56) References Cited

U.S. PATENT DOCUMENTS

| 8,577,896 | B2 | 11/2013 | Sanders | |
|---|---|---|---|---|
| 2010/0005472 | A1* | 1/2010 | Krishnaraj | G06F 9/5038 718/104 |
| 2010/0228819 | A1* | 9/2010 | Wei | G06F 9/505 709/203 |

(Continued)

OTHER PUBLICATIONS

Frank Pfenning, Andre Platzer, Rob Simmons, Lecture Notes on Stacks & Queues, CMU, 2013.*

(Continued)

*Primary Examiner* — Charlie Sun
(74) *Attorney, Agent, or Firm* — Vierra Magen Marcus LLP

(57) ABSTRACT

Computer implemented systems and methods intelligently distribute tasks received from clients among worker resources. One or more databases store information about worker resources and information about clients. A task assignment server, communicatively coupled to the database(s), receives a plurality of tasks that are to be performed for the clients, accesses the stored information about the worker resources, accesses the stored information about the clients, and assigns each of a majority of the tasks to one of the plurality of worker resources, in dependence on the information about the plurality of worker resources and in dependence on the information about the plurality of clients, so that the plurality of tasks are distributed among two or more of the plurality of worker resources. The system can also include a plurality of queues adapted to store information about tasks assigned to the worker resources associated with the queues.

38 Claims, 5 Drawing Sheets

(56) References Cited

U.S. PATENT DOCUMENTS

| | | | | |
|---|---|---|---|---|
| 2010/0287280 A1* | 11/2010 | Sivan | .................... | G06F 9/5072 |
| | | | | 709/226 |
| 2012/0102369 A1* | 4/2012 | Hiltunen | ............... | G06F 11/008 |
| | | | | 714/48 |
| 2013/0268944 A1* | 10/2013 | Fellenstein | ............... | G06F 8/61 |
| | | | | 718/104 |
| 2013/0290128 A1* | 10/2013 | Balamurugan | ........ | G06Q 30/08 |
| | | | | 705/26.4 |
| 2014/0006477 A1* | 1/2014 | Drahzal | ................ | G06F 9/5044 |
| | | | | 709/203 |
| 2014/0101192 A1 | 4/2014 | Sabah et al. | | |
| 2015/0058861 A1* | 2/2015 | Zheng | .................... | H04L 47/56 |
| | | | | 718/104 |
| 2015/0143382 A1* | 5/2015 | Chen | ......................... | G06F 9/50 |
| | | | | 718/104 |
| 2015/0277987 A1* | 10/2015 | Di Balsamo | .......... | G06F 9/5083 |
| | | | | 718/104 |

OTHER PUBLICATIONS

Warfield, et al., Intermediate Accounting: Principles and Analysis, 2nd Edition, John Wiley & Sons, Inc, 2008.*

* cited by examiner

SYSTEMS AND METHODS FOR INTELLIGENTLY DISTRIBUTING TASKS RECEIVED FROM CLIENTS AMONG A PLURALITY OF WORKER RESOURCES

BACKGROUND

It is known that load balancing can be used to distribute tasks among a plurality of resources to avoid overloading of any single resource, to increase overall system throughput, and to reduce response time. However, conventional load balancing often fails to take into account that not all clients, from which the tasks are received, are the same, and not all resources that perform the tasks are the same.

DETAILED DESCRIPTION

Figure 1:
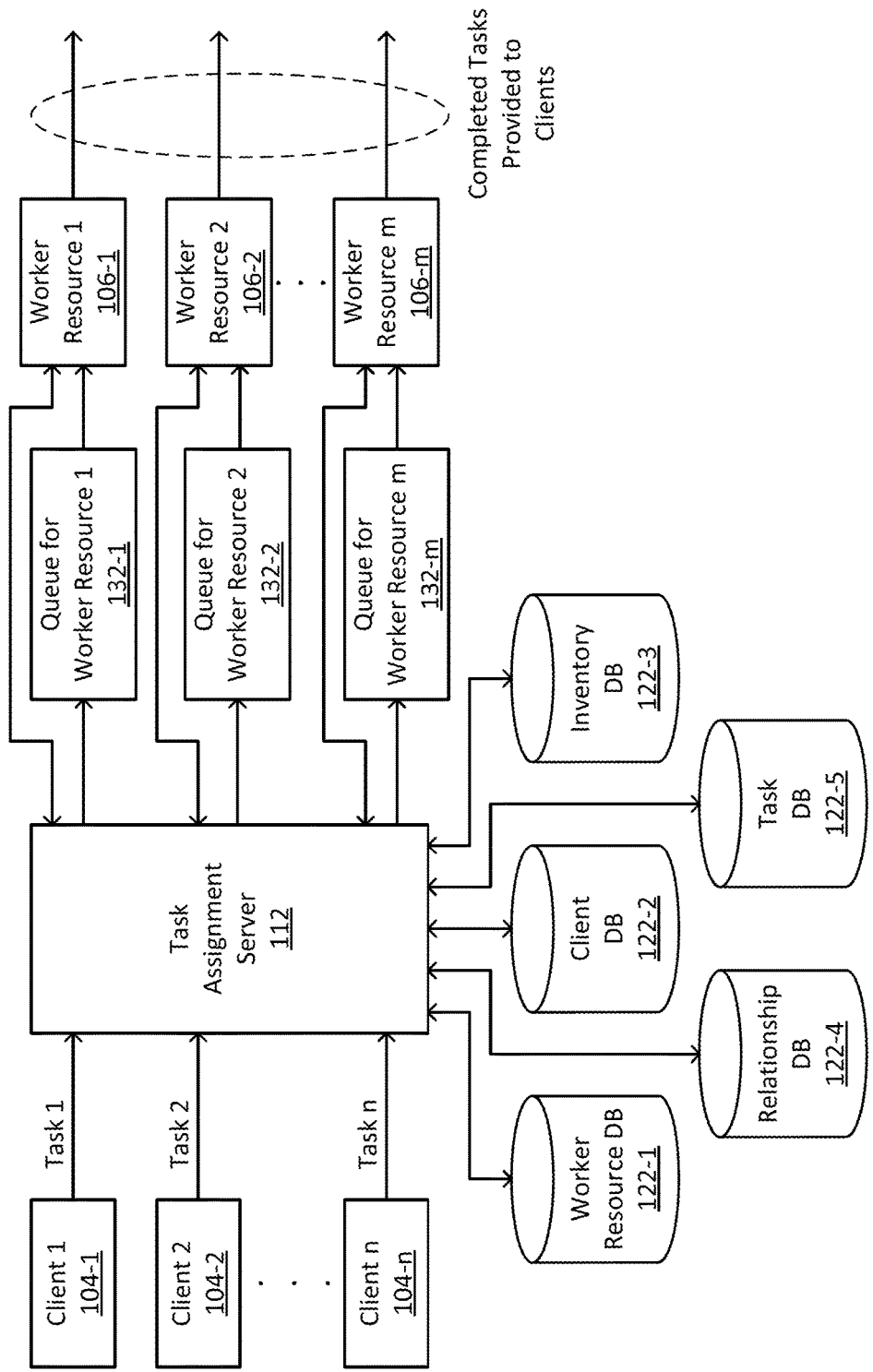
FIG. 1 illustrates a computer implemented system, according to an embodiment of the present technology, for intelligently distributing tasks received from clients among worker resources.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 illustrates a computer implemented system according to an embodiment of the present technology. More specifically, FIG. 1 illustrates a computer implemented for intelligently distributing tasks received from a plurality of clients 104 among a plurality of worker resources 106. The clients, which are labeled 104-1, 104-2 . . . 104n in FIG. 1, can be individually referenced as a client 104, or collectively referenced to as clients 104. Similarly, the worker resources, which are labeled 106-1, 106-2 . . . 106m in FIG. 1, can be individually referenced as a worker resource 106, or collectively referenced as worker resources 106. In accordance with certain embodiments, at any given time there are a total of "n" clients, and a total of "m" worker resources, where "n" and "m" are positive integers and n>m. This way, at least some, and preferably all, of the worker resources 106 will perform tasks for more than one of the clients 104. Indeed, in accordance with certain embodiments n>>m. In accordance with alternative embodiments, n=m, n<m, or n<<m.

Still referring to FIG. 1, the system 102 is shown as including a task assignment server 122 that is communicatively coupled to a plurality of databases 122-2, 122-2, 122-3, 122-4 and 122-5. Additionally, the task assignment server 122 is communicatively coupled to a plurality of queues 132-1, 132-2 . . . 132-m, which can more specifically be referred to as queues for worker resources. The databases 122-1, 122-2, 122-3, 122-4 and 122-5 can be individually referenced as a database 122, or collectively referenced as databases 122. Similarly, the queues (for worker resources), which are labeled 132-1, 132-2 . . . 132-m in FIG. 1, can be individually referenced as a queue 132, or collectively referenced as queues 132.

As will be described in additional detail below, each of the queues 132 is associated with one of the worker resources 106 and is used to store information about tasks assigned to the one of the worker resources 106 associated with the queue 132. Further, the queues 132 are accessible by the worker resources 106 to enable the worker resources to obtain information about the tasks assigned to them, so that they can perform the tasks. In certain embodiments, a worker resource 106 is required to work on tasks in the order specified by the queue 132 associated with the worker resource 106. In other embodiments, a worker resource 106 can work on tasks out of the order specified by the queue 132 associated with the worker resource 106. The queues 132 can be implemented using software, firmware or hardware, or any combination thereof.

The databases 122 are shown as including a worker resource database 122-1, a client database 122-2 and an inventory database 122-3. In accordance with an embodiment, the worker resource database 122-1 stores information about the plurality of worker resources 106, the client database 122-2 stores information about the plurality of clients 104, and the inventory database 122-3 stores information about inventory that is available to the worker resources 106 to perform tasks for the clients 104. The information about the plurality of worker resources 106, which is stored in the worker resource database 122-1, can include availability information about an availability of each of the plurality of worker resources 106 and capability information about one or more capabilities of each of the plurality of worker resources 106, but is not limited thereto. The availability information for each worker resource can include, for example, a work schedule, and an indication of whether or not the worker resource (while scheduled to perform work) is currently working on a task for a client, but is not limited thereto. In an embodiment, the capability information for each of the worker resources 106 can include worker resource attributes, such as, but not limited to, expertise, preference, age, equipment, geographic location, and/or the like. In an embodiment, the information about the plurality of clients 104, which is stored in the client database 122-2, can include can include client attributes, such as, but not limited to, preferences, preferences, age, geographic location, and/or the like.

The inventory database 122-3 can store present inventory information about inventory that is presently available to the worker resources to perform tasks. Additionally, the inventory database 122-3 can store future inventory information about inventory that will be available to worker resources 106 in the future to perform tasks. Such future inventory information can be determined based on inventory orders that have been made to replenish and/or expand an inventory, as well as on scheduled arrival information associated with such orders. Future inventory can also be determined based on item return information that is indicative of items that clients indicated are being returned because they were not accepted by the clients. Further, the system can track how often items in general, or specific items, are returned by clients, and can predict, based on such tracked information, when and to what extent items will be returned and used to replenish the inventory. Certain types of returned items can be restocked, i.e., returned to inventory, whereas other types of returned items cannot be restocked, i.e., cannot be returned to inventory. In an embodiment, the inventory information for each item included in an inventory includes item attributes. Depending upon the types of items included in the inventory, exemplary item attributes include item stock keeping unit (SKU) numbers, item types, items styles, item materials, item colors, item sizes, item costs, item shelf life and/or item expiration date, just to name a few.

The relationship database 122-4 is adapted to store relationship information about previously established relationships between specific combinations of the worker resources 106 and the clients 104. In an embodiment, the relationship information indicates whether or not a particular worker resource 106 has previously performed a task for a particular one of the clients 104, and if so, whether (and/or, to what extent) the particular worker resource 106 successfully performed the task for the client 104. Such relationship information can alternative be stored in the worker resource database 122-1 and/or the client database 122-2, or in some other database or data store.

The task database 122-5 is adapted to store information about tasks received from clients 104. The task database 122-5 can also keep track of which worker resources 106 were assigned which tasks. For example, the task database 122-5 can store a list of tasks that specifies the client that requested that task be performed, the deadline for each task, the worker resource to which each task was assigned (assuming it has already been assigned), and/or the like. In certain embodiments, each of the aforementioned queues 132 provides a worker resource 106 associated with a queue with access to specific portions of the information stored in the task database 122-5.

The task database 122-5 can also store feedback information received from clients 104. Such feedback information can indicate, e.g., whether a task performed for a client 104 by one of the worker resources 106, was successfully performed. Other types of feedback are also possible, as described below. Feedback information can alternatively or additionally be stored in other databases, such as those described above, or in a feedback database (not specifically shown).

It is also possible that all of the aforementioned information is stored in a single database, or that the aforementioned information is stored in more, less or different databases that shown. More generally, one or more databases can be used to store worker resource information, client information, inventory information, relationship information and feedback information, as well as other types of information described herein.

In accordance with an embodiment, each of the clients 104 can provide feedback to the task assignment server 112 regarding whether a task, performed for the client by one of the worker resources 106, was successfully performed. As mentioned above and explained in additional detail below, such feedback information can be stored, which enables the task assignment server 112 to access and utilize the stored feedback information when assigning further tasks received from clients to worker resources. Such feedback information can be stored, e.g., in a feedback database and/or in one of the other databases (e.g., the worker resource database 122-1) discussed with reference to FIG. 1, but is not limited thereto.

Depending upon the particular task, and depending upon how "success" is defined, information about whether (and/or, to what extent) a particular worker resource 106 previously successfully performed a task for a client 104 can be binary information (e.g., yes or no, or 1 or 0), or can be information that includes more levels of granularity (e.g., a score between 0 and 10, or 1 and 100, or a grade between F and A). Where a particular worker resource 106 previously performed multiple tasks for a particular client 104, the relationship information can indicate how often and/or to what extent the multiple tasks were successfully performed by the particular worker resource 106 for the particular client 104. As will be appreciated from additional details provided below, such stored relationship information can be used by the task assignment server 112 when the task assignment server 112 assigns tasks, received from clients 104, to worker resources 106. For example, assume stored relationship information indicates that a particular worker resource 106 has successfully performed all of the tasks, for a particular client 104, previously assigned to the particular worker resource 106. The task assignment server 122 may take into account such relationship information to assign further tasks, received from that particular client 104, to the same worker resource 106 that has had an excellent track record for successfully performing tasks for that particular client 104. For another example, assume that stored relationship information indicates that a particular worker resource 106 previously unsuccessfully performed a task for a particular client 104, in which case, the task assignment server 122 may decide that another task, received from that particular client 104, should be assigned to a different worker resource 106.

Still referring to FIG. 1, the task assignment server 122 is shown as received a plurality of tasks from a plurality of clients 104. The task assignment server 122 may receive the tasks over a communication network, such as, the Internet, a local area network (LAN), a wide area network (WAN), a wireless network, an intranet, a private network, a public network, a switched network, combinations of these, and/or the like. Various communication protocols may be used to facilitate communication between the clients 104 and the task assignment server 112, such as, TCP/IP, HTTP protocols, wireless application protocol (WAP), vendor-specific protocols, customized protocols, but are not limited thereto.

Each of the tasks received by the task assignment server 122 can have an associated completion deadline. The completion deadline for a task can be specified by the client 104 that sent the task, or more generally, by the client 104 for which the task is being performed. Alternatively, the completion deadline can be a fixed amount of time from the time that the task is received by the task assignment server 122. It is also possible that a completion deadline can be specified by the client 104 for which the task is being performed, but if the client failed to specify a completion deadline, the completion deadline is determined to be a fixed amount of time from the time that the task is received by the task assignment server 122. In an embodiment the completion deadline for a task cannot be less than a predetermined minimum amount of time from the time that the task is received by the task assignment server 122. This ensures that the worker resources 106 have adequate time to perform a task. In certain embodiments a client, or an entity associated with a client, can pay a fee to have its task performed on an expedited or rush basis.

In accordance with an embodiment, the task assignment server 112 is adapted assign each of the tasks to one of the plurality of worker resources 106 in dependence on the availability information and the capability information associated with the worker resource 106. For example, the task assignment server 112 may assign a task for a specific client 104 to a specific worker resource 106 if the specific worker resource 106 is presently available (or will be available within a specified window of time in the future) and the specific worker resource 106 has capabilities and/or other attributes that match the specific client 104 and/or the task within a specified threshold or range. Additionally, as alluded to above, the task assignment server 112 can assign each of the tasks to one of the plurality of worker resources 106 also in dependence on relationship information, examples of which were discussed above. More specifically, the task assignment server can be adapted to assign at least some of the tasks to at least some of the plurality of worker resources also in dependence on the relationship information. For example, the task assignment server may give preference to assigning a task for a client to a specific worker resource that previously successfully performed a task for that client. Various different types of matching, similarity and/or probability algorithms can be used by the task assignment server 112 to assign tasks to worker recourses. One or more algorithms can utilize adaptive machine learning to modify itself and/or to modify information stored the aforementioned databases based on feedback received from clients 104 and/or worker resources 106. Such feedback can be input by clients and/or worker resources. Additionally, or alternatively, feedback may be generated by tracking behaviors of the clients and/or worker resources.

After the task assignment server 112 assigns a particular task to a particular one of the worker resources 106, the task assignment server can send the task (or more specifically, information about the task) directly to the particular worker resource 106. Alternatively, after the task assignment server 112 assigns a particular task to a particular one of the worker resources 106, the task assignment server puts the task (or more specifically, information about the task) in the queue 132 that is associated with the particular one of the worker resources 106 to which the task is assigned. In accordance with an embodiment, each of the queues 132 stores one or more tasks, assigned to one of the worker resources 106 associated with the queue 132, that has/have not yet been performed by the worker resource 106. In one embodiment, a task remains in the queue 132 (for a worker resource 106) until the worker resource 106 has begun working on the task. In another embodiment, a task remains in the queue 132 (for a worker resource 106) until the worker resource 106 has finished working on (i.e., has completed performing) the task. Other variations are possible, and within the scope of embodiments described herein. In accordance with an embodiment, the queues 132 are maintained and controlled by the same entity that maintains and controls the task assignment server 112.

The task assignment server 122 may send the tasks (or more specifically, information about the tasks) to the worker resources 132 over one or more communication network, such as, the Internet, a local area network (LAN), a wide area network (WAN), a wireless network, an intranet, a private network, a public network, a switched network, combinations of these, and/or the like. Alternatively, the task assignment server 112 stores assigned tasks (or more specifically, information about the tasks) within the queues 132, and each of the worker resources accesses its associated queue 132 via a communications interface, such as, but not limited to, a web browser, thereby eliminating the need for any of the worker resources to obtain custom software that enables the worker resources to accept or otherwise access and perform tasks. In other words, each worker resource 106 can utilize a communications interface (e.g., a web browser) and a communication network (e.g., the Internet, a LAN, a WAN, a wireless network, an intranet, a private network, a public network, a switched network, combinations of these, and/or the like) to access its queue to obtain a task (or more specifically, information about the tasks) and start working on the task.

The task assignment server 112 can assign tasks to worker resources 106 without being responsive to requests for tasks from the worker resources 106. In other words, the task assignment server 112 can assign a task to a worker resource 106 without first receiving a request for a task from the worker resource 106. Additionally, or alternatively, the task assignment server 112 can assign tasks to worker resources 106 in response to receiving requests for tasks from the worker resources 106. For example, a worker resource 106 may automatically request a task when the worker resource is sitting idle, when there are no tasks in the queue 132 associated with the worker resource 106, or when the number of tasks in the queue 132 associated with the worker resource 106 is below a corresponding threshold, but is not limited thereto. A worker resource 106 may alternatively manually request a task, e.g., by selecting a predetermined button, or the like.

The system 102 can be said to be following a "push" model when the task assignment server 112 assigns tasks to worker resources 106 without specifically receiving requests for tasks from the worker resources 106. Alternatively, the system can be said to follow a "pull" model when the task assignment server 112 assigns tasks to worker resources 106 in response to receiving requests for tasks from the worker recourses 106. It is also possible that a combination of the "push" model and the "pull" model be followed by the system 102. For example, the task assignment server 112 can follow the "push" model and assign a first subset of tasks to a first subset of worker resources 112, substantially immediately after receiving the first subset of tasks, e.g., in dependence on the completion deadlines associated with the first subset of the plurality of tasks, without being responsive to requests for tasks. Additionally, the task assignment server 112 can follow the "pull" model and assign a second subset of the plurality of tasks to a second subset of the plurality of worker resources 106, in dependence on the completion deadlines associated with the second subset of the plurality of tasks, in response to receiving requests for tasks from the second subset of the plurality of worker resources 106. For a more specific example, where a completion deadline for a received task is within a specific deadline threshold (e.g., within 72 hours of a present time), that task may be "pushed" by the task assignment server 112 to a worker resource 106 that should be able to complete the task by the completion deadline. On the other hand, where a completion deadline for a received task is not within a specific deadline threshold (e.g., not within 72 hours of a present time), the task assignment server 112 may wait until one of the worker resources 106 requests a task before assigning the task to one of the worker resources 106, in which case the worker resource 106 can be said to have "pulled" the task from the task assignment server 112. Other ways of combining the "push" and "pull" models are also possible and within the scope of the embodiments described herein.

In accordance with an embodiment, the tasks stored in the queues 132 are only the tasks that are "pushed" by the task assignment server 112 to worker resources 106. In such an embodiment, tasks that are "pulled" are not stored in the queues 132. Alternatively, tasks can be stored in the queues 132 regardless of whether they are "pushed" to, or "pulled" by, worker resource 106. In other words, one or more tasks (or information indicative thereof) that are stored in one of the queues 132 may have been assigned using the "push"

model, and one or more further tasks (or information indicative thereof) that are stored in the same one of the queues 132 may have been assigned using the "pull" model.

In accordance with certain embodiments, the task assignment server 112 utilizes one or more task assignment rules to assign tasks received from clients 104 to worker resources 106. Such rules can be stored, e.g., in a memory of the task assignment server 112 or in a data base that stores such rules. The rules can be manually updated from time to time, and/or can be automatically modified based on feedback received from clients 104 and/or worker resources 106 utilizing adaptive machine learning. One such rule can attempt to maximize the probability that a task is performed successfully. Another such rule can attempt to maximize the similarity between a client and a worker resource. A further rule can be used to select which tasks are to be assigned randomly, and still a further rule can be used to perform random assigning of tasks. The term random, as used herein, also encompasses pseudorandom. At any given time, a single rule can be utilized to assign tasks, or a weighted combination of rules can be used to assign tasks. There can even be a rule that specifies how to weight various other rules.

In an embodiment, tasks are ordered in a queue for a worker resource based on the order in which the tasks were assigned to the worker resource. In another embodiment, tasks are ordered in a queue based on the deadlines associated with the tasks. In an embodiment, worker resources are required to work on the tasks in their queues in the specific order specified by their queues. In another embodiment, worker resources can work on tasks out of order, i.e., independent of the order specified by the queues. Other variations are also possible and within the scope of the embodiments described herein.

In certain embodiments, the task assignment server 112 may delay assigning certain tasks to worker resources 106, whether following the "push" model or the "pull" model. For example, the task assignment server 106 may determine that in certain instances there is a relatively low probability of any worker resource can successfully perform a task for a particular client, utilizing the presently available inventory. However, the task assignment server 106 may determine that the probability that one or more worker resources are able to successfully complete the task for the particular client will be significantly increased after the inventory is restocked over the next 24 hours. Assuming the completion deadline for the particular task is far enough out, e.g., is not for another 5 days, the task assignment server 112 may delay assigning the particular task to one of the worker resources 106 in dependence on present inventory information and future inventory information. In other words, in certain instances it may be better for the task assignment server 112 to wait until a point of time in the future, when the inventory improves/changes, before assigning a task for a particular client 104 to a worker resource 106, e.g., to increase the likelihood that a worker resource 106 will successfully perform a task for the particular client 104.

In accordance with an embodiment, for any individual task, the task assignment server 112 can determine whether the task should be assigned to one of the worker resources without receiving a request for a task, or in response to receiving a request for task. For example, the assignment server 112 may "push" tasks that have a completion deadline fast approaching, while allowing other tasks that have a completion deadline relatively far out to be "pulled".

Additionally, or alternatively, the task assignment server 112 may delay assigning a specific task to a worker resource until a better matching worker resource 106 becomes available. For example, where the task assignment server 112 assigns at least some tasks in dependence on the relationship information, the task assignment server 112 may give preference to assigning a task for a client to a specific worker resource that previously successfully performed a task for that client. In such a case, if the task assignment server 112 determines that the specific worker resource 106 is not presently available, but will become available within an acceptable period of time, the task assignment server 112 may wait until that specific worker resource 106 because available before assigning the task. In other words, in certain instances it may be better for the task assignment server 112 to wait until a point of time in the future, when one or more specific worker resource(s) will be available, before assigning a task for a particular client 104 to a worker resource 106, e.g., to perpetuate a previously established relationship between the particular client 104 and one of the worker recourses 106 and/or to increase the likelihood that a worker resource 106 will successfully perform a task for the particular client 104.

In some embodiments, the task assignment server 112 can only assign a task to a worker resource 106 that is presently available, i.e., available at the time the task is being assigned. In other embodiments, the task assignment server 112 can assign a task to a worker resource 106 that is not presently available, but that based on worker resource availability information, is predicted to have a future availability that will enable the worker resource 106 to complete the task before the completion deadline for the task (e.g., assuming a specific amount of time is required for a worker resource to complete a task). The amount of time that it is assumed a worker resource takes to complete a task can be a fixed predetermined amount of time, or it can be a calculated amount of time, e.g., by determining an average (mean, median or mode) amount of time it takes or took the worker resource to complete a plurality of tasks. All worker resources can be assumed to take the same amount of time to complete a task. Alternatively, the amount of time that it is assumed it takes a worker resource to complete a task can be determined for individual worker resources, e.g., by determining an average (mean, median or mode) amount of time it takes or took each individual worker resource to complete a plurality of tasks. Where a worker resource does not have a history of performing tasks, or has a minimal history, the amount of time that it is assumed it takes the worker resource take to complete a task can initially be a fixed predetermined amount of time (or an average time of other worker resources), and then, after the worker resource has a meaningful history of performing tasks, that history can be used to determine the amount of time that it is assumed it takes or took the worker resource to complete a task.

In some embodiments, the task assignment server 112 can only put tasks in the queue 132 associated with a worker resource 106 that is presently available. In other embodiments, the task assignment server 112 can put tasks in the queue 132 associated with a worker resource 106 that are not presently available, but that based on worker resource availability information, is predicted to have a future availability that will enable the worker resource 106 to complete the task before the completion deadline for the task (e.g., assuming a specific amount of time is required for a worker resource to complete a task).

In accordance with an embodiment, the task assignment server 112 will only assign a task to a worker resource 106 if the total amount of tasks included in the queue 132 associated with the worker resource 106 is below a corresponding queue threshold. The queue threshold can be the same for all worker resources 106. Alternatively, different worker resources 106 can have different queue thresholds. For example, the magnitude of the queue threshold for a worker resource 106 can be proportional to the productivity of the worker resource 106, such that the more tasks the worker resource 106 has historically shown it is capable of performing within a specified amount of time (e.g., one week), then the greater the queue threshold for the worker resource. Conversely, where a worker resource 106 has historically shown it is only capable of performing relatively few tasks within a specified amount of time (e.g., one week), then the queue threshold for the worker resource can be relatively small. In such an embodiment, if a worker resource increases its throughput and/or efficiency over time, its queue threshold can accordingly be increased.

In accordance with an embodiment, the task assignment server 112 is adapted to calculate, for each of (or at least some of) the plurality of worker resources 106, a probability of success that the worker resource will successfully perform one of the tasks for a particular one of the clients 104. The task assignment server 112 can thereby assign a task for the particular one of the clients to one of the worker resources in dependence on the calculated probabilities of success. For example, a task for a client can be assigned to the worker resource calculated to have the highest probability of success. As will be described in additional detail below, and as alluded to above, "success" can be defined in different manners, e.g., depending upon the type of task, or there can even be different ways of defining success for a particular type of task. Regardless, the task assignment server 112 can be adapted to calculate, in a specific manner, a probability of success that a particular worker resource 106 will successfully perform a task for a particular client 104, so that similarly calculated probabilities of success can be compared to one another and utilized by the task assignment server 112 to determine to which worker resource 106 to assign a task.

The task assignment server 112 can additionally, or alternatively, be adapted to calculate other metrics (besides probability of success) that can be used by the task assignment server 112 to assign tasks to worker resources. For example, for certain types of tasks it may be advantageous that a worker resource that performs a task for a client is similar to the client, in which case the task assignment server 112 can calculate one or more similarity metrics, and the task assignment server 112 can utilize such similarity metric(s) when assigning tasks. For a more specific example, the task assignment server can calculate a distance or similarity metric between specific attributes associated with a client and specific attributes associated with a worker resource, with each distance or similarity metric being assigned a weight. Another exemplary metric that the task assignment server 112 can calculate is an escalation score, which quantifies how difficult it is for a task to be successfully performed for a particular client. Such an escalation score can be used, e.g., to assign tasks for difficult to satisfy clients to specific worker resources that have historically proven that they can successfully perform tasks for such clients. An escalation score can alternatively or additionally be used to assign difficult to perform tasks to specific worker resources that have historically proven that they can successfully perform such tasks. Another metric that can be calculated is a degree of urgency, which in an embodiment, is weighted higher than all other metrics, or overrides all other metrics. For example, in an embodiment, if a task has a maximum degree of urgency, and thus needs to be performed immediately, then no other metric matters and the task is assigned to a worker resource that is immediately available and has a proven history of completing tasks quickly.

In accordance with an embodiment, the task assignment server 112 is adapted to reassign tasks included in the queues 132 associated with the worker resources 106 so that one of the tasks for one of the clients 104 is transferred from a first one of the queues 132 associated with a first one of the worker resources 104 to a second one of the queues 132 associated with a second one of the worker resources 106. For example, the task assignment server 112 may have initially put a task (or more specifically, information indicative of the task), received from the client 104-1, in the queue 106-1 associated with the worker resource 106-1. Thereafter, the task assignment server 112 can reassign the task to the worker-resource 106-2, in which case the task (or more specifically, information indicative of the task) can be removed from the queue 132-1 and moved to the queue 132-2, or sent directly to the worker resource 106-2. The task assignment server 112 can reassign the particular task, for example, if a quantity of tasks (ahead of the particular task included in the queue 132-1 associated with the worker resource 106-1) is greater than a specified reassignment threshold. Alternatively, or additionally, if the task assignment server 112 determines that there is another worker resource available that has a higher probability of success than the worker resource presently having the task in its queue, then the task assignment server 112 can reassign the task to the worker resource having the higher probability of success. Alternatively, or additionally, if the task assignment server 112 determines that there is another available worker resource that already has a relationship with the client for which the task is being performed, then the task assignment server 112 can reassign the task to the worker resource already having the relationship with the client. Other variations are also possible, and within the scope of an embodiment.

In accordance with an embodiment, the task assignment server 112 is adapted to assign at least some of the tasks it receives from the clients 104 (e.g., a minority of the tasks) to worker resources 106 in a random manner. This enables the task assignment server 112 to test out new combinations of the worker resources and the clients and establish new relationships therebetween. This also enables a computer model, implemented by the task assignment server 112, to obtain additional types of data that enables the computer model to adaptively learn how to best assign tasks to worker resources to maximize a probability of success and/or maximize other metrics. The task assignment server 112 can be adapted to assign a specified percentage (e.g., 1% or 5%) of tasks to worker resources 106 in a random manner. For example, 1 out of every 100 tasks can be assigned in a random manner. The selection of which tasks to assign in a random manner can itself be random, can be periodic (e.g., every hundredth new task is assigned randomly), or can be based on specific criteria. Other variations are also possible and within the scope of embodiments described herein.

Embodiments of the present technology, described herein, can be use with various different types of clients, various different types of tasks, various different types of worker resources and various different types of inventory, some examples of which are discussed below.

In accordance with an embodiment, the clients 104 are client computing devices, the tasks are computational tasks to be performed for the client computing devices under the control and/or coordination of a service provider, and the worker resources 106 are server computing devices that have computational bandwidth available to perform computational tasks. In such an embodiment, the inventory can be physical or virtual components that the server computing devices utilize to perform the computational tasks. Availability information can indicate which server computing devices are available to perform computational tasks, e.g., because they are turned on but not currently being fully utilized and/or are sitting idle. Capability information can indicate whether a server computing device has a certain type of processing unit, such as, but not limited to, a graphics processing unit, an accelerated processing unit, an audio processing unit, and/or a certain amount and/or type of internal memory, and/or the like. In such an embodiment, a computational task can be considered to be performed successfully by the worker resource 106 if the completed task is performed correctly within a specified amount of allotted time.

In accordance with another embodiment, the clients 104 are fabless semiconductor manufacturers, the tasks are the manufacturing of semiconductor devices under the control and/or coordination of a service provider, and the worker resources 106 are semiconductor foundries, semiconductor manufacturing lines (e.g., within a foundry) and/or semiconductor manufacturing equipment (e.g., within a manufacturing line) that are used to manufacture semiconductor devices for the clients. In such an embodiment, the inventory can be specific sizes and/or types of semiconductor wafers, specific film deposition materials and/or specific metals that are used to form metal traces, metal vias and/or the like. Availability information can indicate which semiconductor foundries, semiconductor manufacturing lines and/or semiconductor manufacturing equipment is available to manufacture semiconductor devices, e.g., because they are not currently being fully utilized and/or are sitting idle. Capability information can indicate whether a semiconductor foundry or semiconductor manufacturing line has certain types of semiconductor manufacturing tools, the size(s) of wafers that can be handled, the processing technology, the capacity and/or the like. In such an embodiment, a task can be considered to be performed successfully by the worker resource 106 if a yield associated with the completed task (i.e., manufactured semiconductor devices) meets or exceeds a specified level, and the task is completed within a specified amount of allotted time (e.g., before the completion deadline).

In accordance with a further embodiment, the clients 104 are customers of a custom vehicle seller type of service provider, the tasks are the building of custom vehicles for the clients/customers under the control and/or coordination of the service provider, and the worker resources are manufacturers that are contracted by the service provider to build custom vehicles for the clients/customers of the service provider. In such an embodiment, the inventory can be vehicle parts, such as tires, shocks, engines, upholstery materials and/or the like. Availability information can indicate which manufacturers are available to manufacture a custom vehicle. Capability information can, for example, indicate specific expertise of the manufacturers, specific equipment owned by the manufacturers, and/or the like. In such an embodiment, a task can be considered to be performed successfully by the worker resource 106 if the client/customer is satisfied with and purchases the custom vehicle.

In accordance with another embodiment, the clients 104 are customers of a service provider (e.g., that selects products to be shipped to the clients/customers), the tasks are services to be performed for the clients/customers under the control and/or coordination of the service provider, and the worker resources are people that are contracted by the service provider to perform the tasks/services for the clients/customers of the service provider. In such an embodiment, the inventory can be clothes, food, beverages or other types of physical products of interest to the clients/customers, and the tasks can be the selecting a subset of the inventory for shipping to (and hopefully purchase by) the clients/customers. Availability information can indicate which people are scheduled to perform work on behalf of the service provider. Capability information can, for example, indicate a specific expertise, preferences, age and/or the like of each of the worker resources. In such an embodiment, a task can be considered to be performed successfully by the worker resource 106 if the client 104 purchases a specific number or percentage of the item(s) shipped or otherwise provided to them.

Figure 2A:
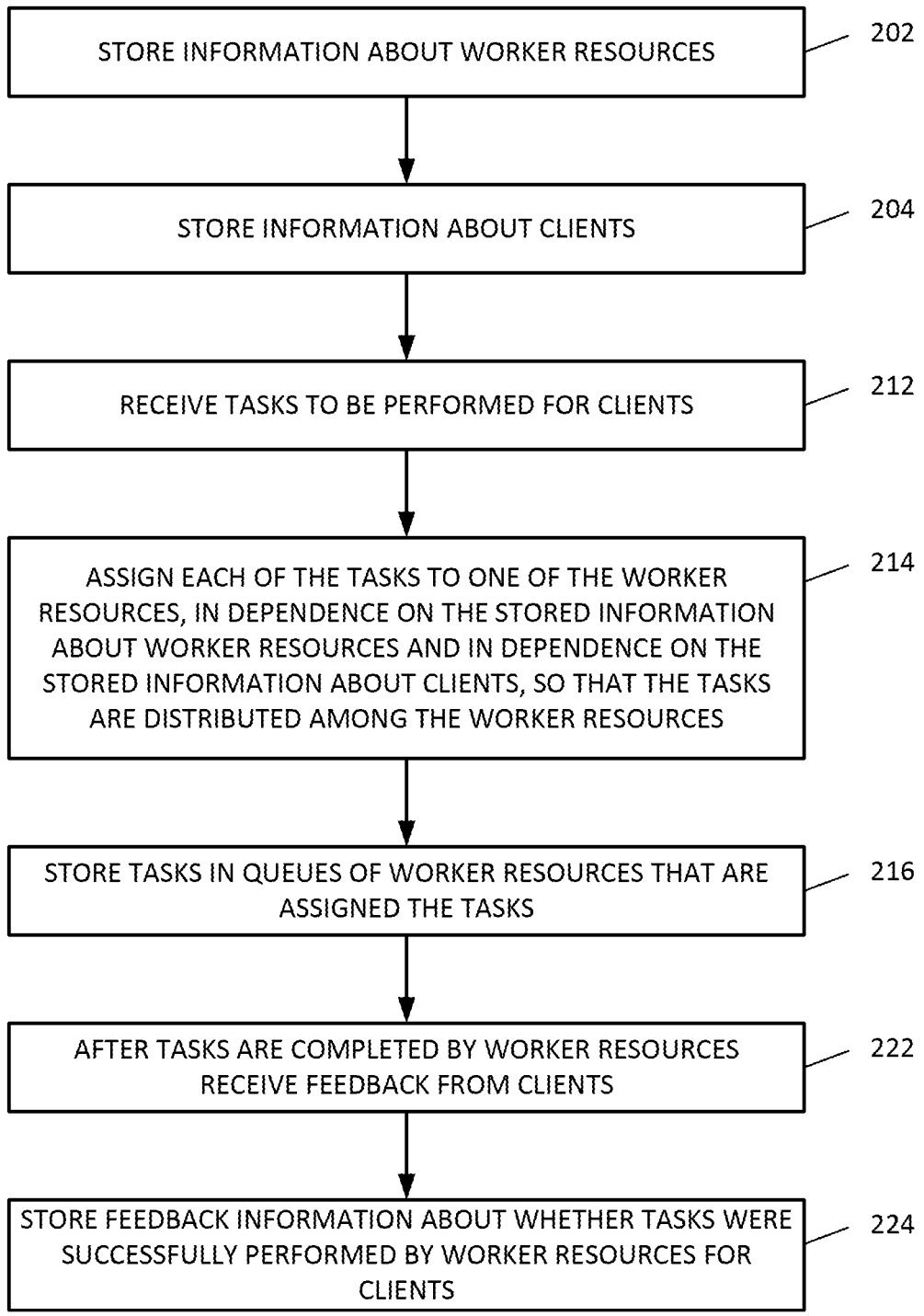
FIGS. 2A, 2B and 2C are high level flow diagrams that are used to summarize methods, according to various embodiments of the present technology, for intelligently distributing tasks received from clients among worker resources.

FIG. 2A is a high level flow diagram that is used to summarize methods, according to certain embodiments of the present technology, for intelligently distributing tasks received from clients among a plurality of worker resources. Referring to FIG. 2A, step 202 involves storing information about a plurality of worker resources. Step 204 involves storing information about a plurality of clients. Referring briefly back to FIG. 1, the information about worker resources can be stored in the worker resource database 122-1, and the information about clients can be stored in the client database 122-2. Referring again to FIG. 2A, the information stored at step 202 can include availability information about an availability of each of the plurality of worker resources. Additionally, the information stored at step 202 can include capability information about one or more capabilities of each of the plurality of worker resources. The information stored at step 204 can specify attributes of clients, which can be used (e.g., by the task assignment server 112) to determine which worker resources and clients are well matched.

Still referring to FIG. 2A, step 212 involves receiving tasks that are to be performed for clients. Step 214 involves assigning each of the tasks to one of the worker resources, in dependence on the stored information about worker resources and in dependence on the stored information about clients, so that the tasks are distributed among two or more (and preferably all) of the worker resources. For example, availability information and capability information associated with worker resources can be used to determine how to assign tasks to worker resources. Additionally, attributes of clients can be used to determine how to assign tasks.

Still referring to FIG. 2A, step 216 involves storing tasks in queues associated with worker resources that have been assigned the tasks. When it is stated that a task is stored in a queue, the information stored in the queue may not be exactly the same task information obtained from a client, but rather, may actually be information indicative of the task. In other words, the data associated with a particular task, that is received by the task assignment server 112 from a client, may not be identical to the data associate with the particular task that the task assignment server puts in a queue 132. However, the data put in the queue is indeed indicative of the task received from the client.

Referring briefly back to FIG. 1, the queues 132 are examples of the queues in which tasks can be stored at step 216. In an embodiment, a task is stored in a queue 132 until a worker resource, associated with the queue, begins working on the task. In another embodiment, a task is stored in a queue 132 until a worker resource, associated with the queue, finishes performing the task. A task is removed from a queue when the task has been completed. Additionally, a task may be removed from one queue and placed in another queue if the tasks is reassigned from one worker resource to another. Still referring back to FIG. 1, steps 212, 214 and 216 can be performed by the task assignment server 122.

As described above with reference to FIG. 1, the assigning at step 214 can include assigning tasks to worker resources without receiving requests from worker resources, which was referred to above as the "push" model. Additionally, or alternatively, the assigning at step 214 can include assigning tasks to worker resources in response to receiving requests for tasks from the worker resources, which was referred to above as the "pull" model. For example, step 214 can include assigning a first subset of a plurality of tasks to a first subset of a plurality of worker resources without receiving requests for tasks from the first subset of the plurality of worker resources, as well as assigning a second subset of the plurality of tasks to a second subset of the plurality of worker resources in response to receiving requests for tasks from the second subset of the plurality of worker resources. In such an embodiment, which utilizes a combination of the "push" model and "pull" model, there can be an overlap between the first subset of worker resource (to which tasks are pushed) and the second subset of worker resource (that pull tasks). In other words, a same worker resource can receive one or more tasks without requesting them, and receive one or more further tasks in response to requesting them. In certain embodiments, tasks are stored in a queue associated with a worker resource where the tasks are pushed to the worker resource, but are not stored in the queue associated with the worker resource where the tasks are pulled by the worker resources. In other embodiments, tasks are stored in a queue associated with a worker resource regardless of whether the task was pushed to or pulled by the worker resource.

Referring again to FIG. 2A, as indicated at step 222, feedback is received from each of the clients regarding whether a task, performed for the client by one of the worker resources, was successfully performed, which is not the same as simply completed. In other words, just because a task was performed by a worker resource for a client does not mean that the task was successfully performed. Rather, as explained in certain examples discussed above, a client may determine and provide feedback that a task, performed and completed on its behalf by a worker resource, was unsuccessfully performed. As indicated at step 224, such feedback information can be stored, which enables the task assignment server 112 to access and utilize the stored feedback information when assigning further tasks received from clients to worker resources. Such feedback information can be stored, e.g., in a feedback database and/or in one of the other databases (e.g., the worker resource database 122-1) discussed above with reference to FIG. 1, but is not limited thereto. Alternative and/or additional types of feedback can be received from clients, e.g., feedback can provide more granularity than whether or not a task was completed successfully. For a more specific example, a client may provide feedback that specifies to what extent they were satisfied with a task performed by a worker resource. Additionally, or alternatively, in certain embodiments certain types of clients can be asked to respond to survey questions, with answers to such question being another example of feedback. More generally, a system (e.g., 102) can prompt a client (e.g., 104) to provide feedback for various different attributes associated with a completed task and/or a worker resource that completed the task, which feedback can be referred to as explicit feedback, which in many instances is subjective. Feedback can alternatively be considered implicit, in that it is based on one or more actions made by a client, e.g., whether or not a client accepted or returned (and thus rejected) the results of a task.

Figure 2B:
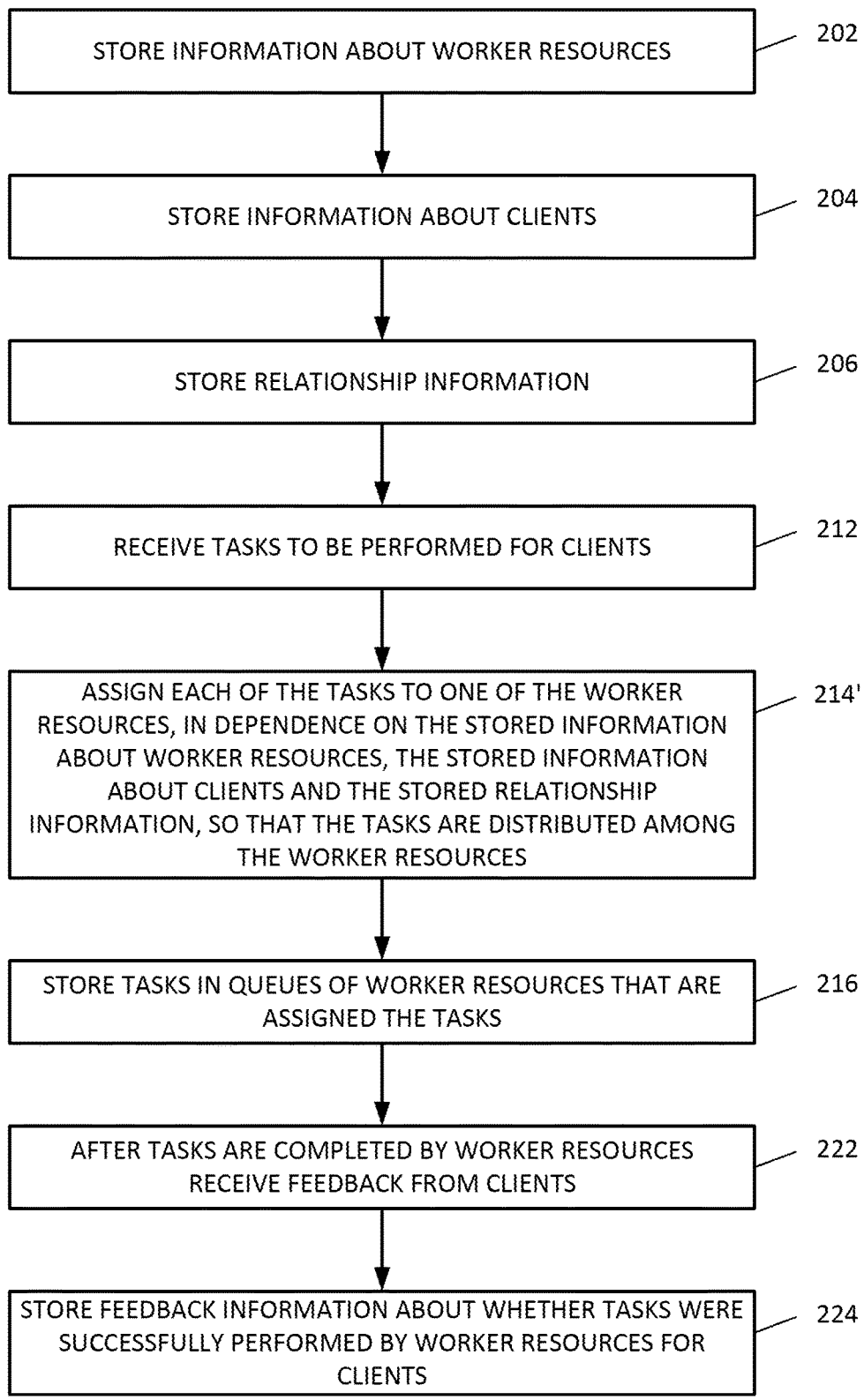

Reference is now made to FIG. 2B, which is similar to FIG. 2A, but adds some additional details associated with certain embodiments of the present technology that are used for intelligently distributing tasks received from clients among a plurality of worker resources. More specifically, the embodiments described with reference to FIG. 2B are especially useful where a service provider deems it important or otherwise useful to establish and potentially maintain relationships between worker resources and clients. Referring to FIG. 2B, steps 202 and 204 are the same as in FIG. 2A, and thus details thereof need not be repeated. Still referring to FIG. 2B, step 206 involves storing relationship information about previously established relationships between specific combinations of the worker resources and the clients. As noted above in the discussion of FIG. 1, such relationship information can be stored in the relationship database 122-4, the worker resource database 122-1 and/or the client database 122-2, but is not limited thereto. In an embodiment, the relationship information indicates whether or not a particular worker resource 106 has previously performed a task for a particular one of the clients 104, and if so, whether (and/or, to what extent) the particular worker resource 106 successfully performed the task for the client 104. In other words, the stored relationship information can include feedback information. Alternatively, feedback information can be stored separately from the relationship information, e.g., in a feedback database (not specifically shown). Step 212 in FIG. 2B, is the same as in FIG. 2A, and thus, details thereof need not be repeated.

In FIG. 2B, step 214' is a variation of step 214 discussed above with reference to FIG. 2A. More specifically, step 214' involves assigning each of the tasks (received at step 212) to one of the worker resources, in dependence on the stored information about worker resources, the stored information about clients, and also in dependence on the stored relationship information about previously established relationships between specific combinations of the worker resources and the clients. For example, a preference may be given to assigning a task for a client to a specific worker resource that previously successfully performed a task for that client. Conversely, where a worker resource previously performed a task for a client, but the task was not successfully performed, then the next time a task for that client is assigned the preference may be that the task is assigned to a different worker resource.

Steps 216, 222 and 224 are the same as in FIG. 2A, and thus details thereof need not be repeated. In FIG. 2B the storing of relationship information at step 206 is shown as being performed separately from storing feedback information at step 224. In another embodiment, steps 206 and 224 can be combined into a single step. Over time, as relationships develop and feedback is obtained, more relationship information is stored at step 206 and/or relationship information is updated at step 206.

Figure 2C:
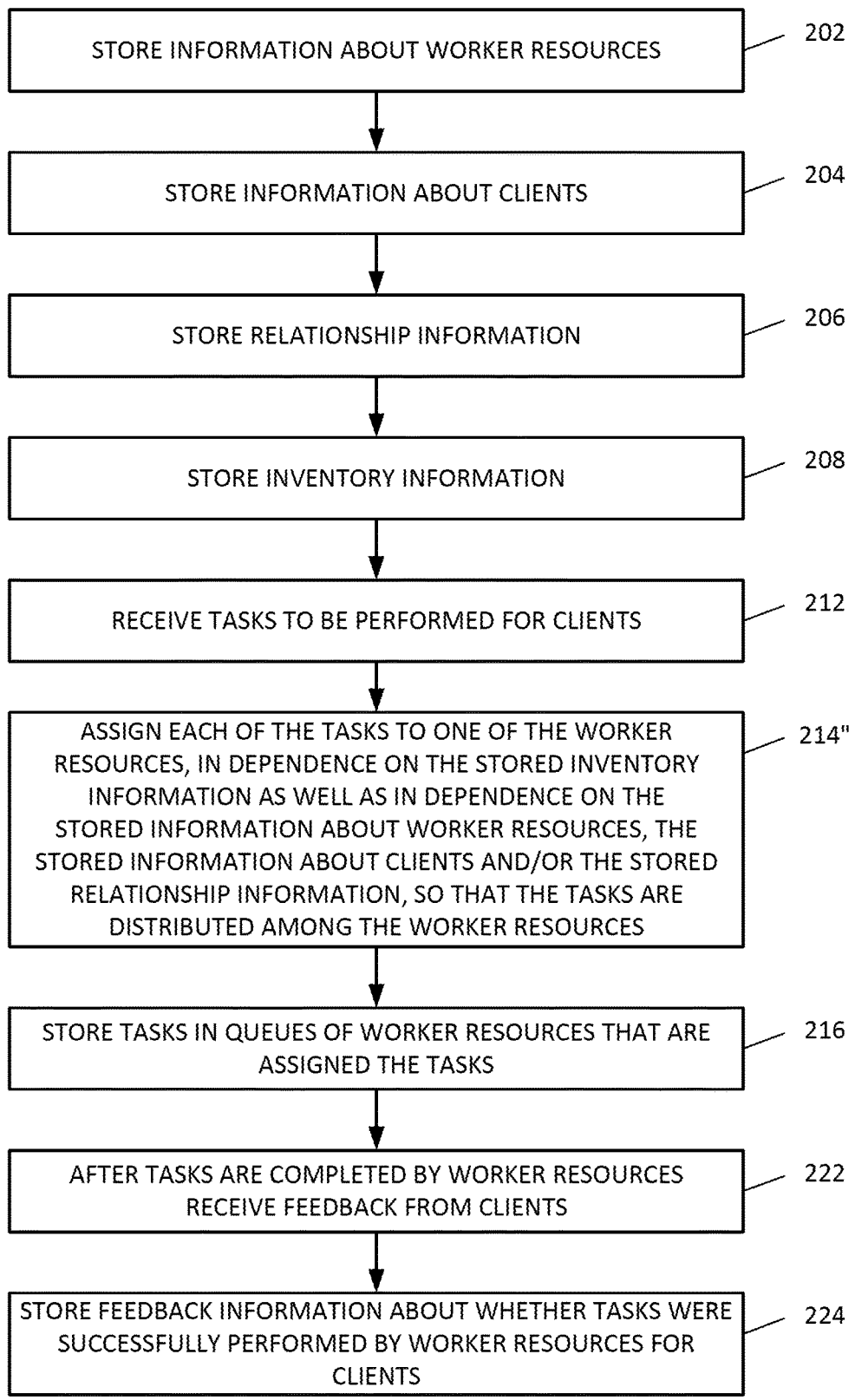

Reference is now made to FIG. 2C, which is similar to FIGS. 2A and 2B, but adds some additional details associated with certain embodiments of the present technology that are used for intelligently distributing tasks received from clients among a plurality of worker resources. More specifically, the embodiments described with reference to FIG. 2C are especially useful where the worker resources utilize items included in an inventory to perform the tasks for the clients. Referring to FIG. 2C, steps 202 and 204 are the same as in FIG. 2A, and step 206 is the same as in FIG. 2B, and thus details thereof need not be repeated. Still referring to FIG. 2C, step 208 involves storing inventory information. Such inventory information can include present inventory information about inventory that is presently available to the worker resources to perform tasks. Additionally, the inventory information can include future inventory information about inventory that will be available to worker resources in the future to perform the tasks. As explained above, future inventory information can be determined, e.g., based on inventory orders that have been made to replenish and/or expand an inventory, as well as on scheduled arrival information associated with such orders. Future inventory can also be determined based on item return information that is indicative of items that clients indicated are being returned because they were not accepted by the clients. Further, the method can including tracking how often items in general, or specific items, are returned by clients, and based on such tracked information, there can be predictions of when and to what extent items will be returned and used to replenish the inventory. In an embodiment, the inventory information for each item included in an inventory can include item attributes. As noted above in the discussion of FIG. 1, such inventory information can be stored in the inventory database 122-3, but is not limited thereto.

In FIG. 2C, step 214" is a variation of steps 214 and 214' discussed above with reference to FIGS. 2A and 2B. More specifically, step 214" involves assigning each of the tasks (received at step 212) to one of the worker resources, in dependence on the stored inventory information, as well as in dependence on the stored information about worker resources, the stored information about clients and/or the stored relationship information about previously established relationships between specific combinations of the worker resources.

In accordance with certain embodiments, one or more task assignment rules can be used to perform steps 214, 214' or 214". Examples of such rules were discussed above. In accordance with certain embodiments, the assigning of tasks, performed at steps 214, 214' or 214", can sometimes be performed in a random manner, as was noted above in the discussion of the task assignment server 112 with reference to FIG. 1. This enables new combinations of the worker resources and the clients to be tested, to establish new relationships therebetween. This also enables a computer model to adaptively learn how to best assign tasks to worker resources to maximize a probability of success and/or other metrics. For example, as noted above, a relative small percentage of tasks can be assigned to worker resources in a random manner. The selection of which tasks are to be assign in a random manner can itself be random, or can be periodic, or can be based on some specific criteria.

Figure 3:
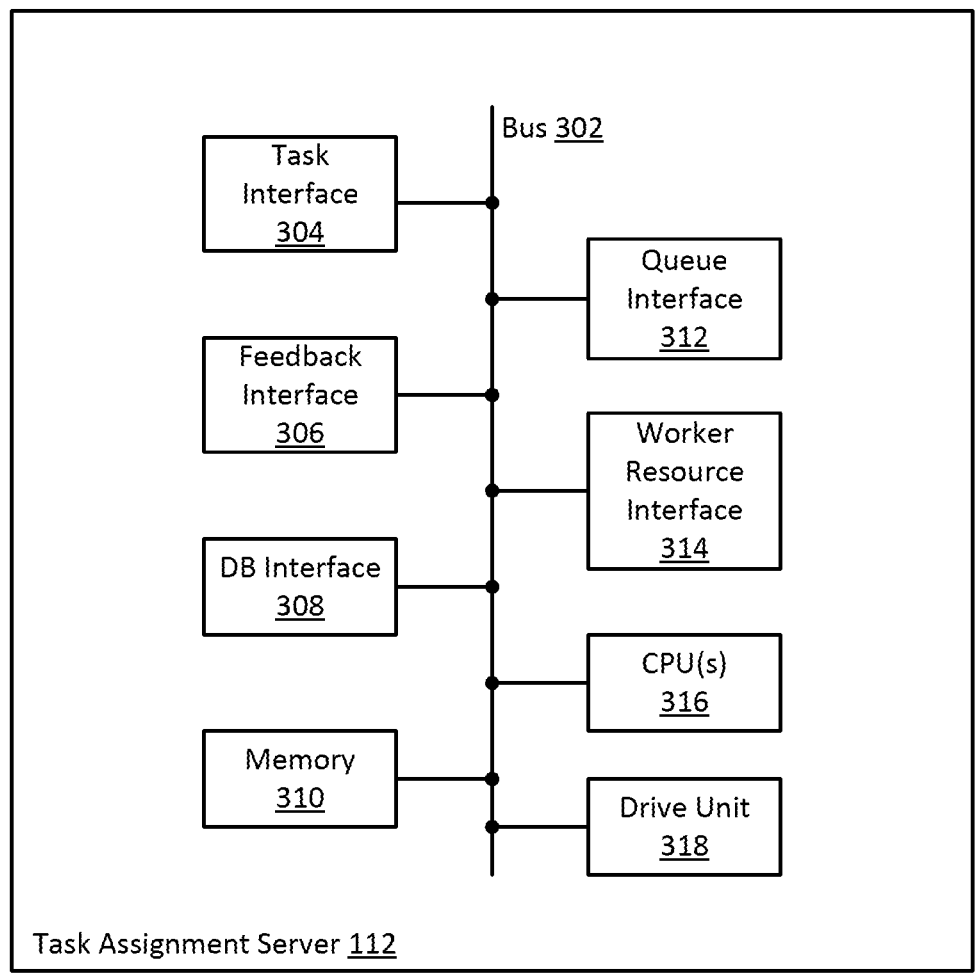
FIG. 3 illustrates exemplary details of the task assignment server introduced in FIG. 1, according to an embodiment of the present technology.

FIG. 3 illustrates exemplary details of the task assignment server 112 introduced in FIG. 1, according to an embodiment of the present technology. Referring to FIG. 3, the task assignment server is shown as including a bus 302, a task interface 304, a feedback interface 306, a database (DB) interface 308, memory 310, a queue interface 312, a worker resource interface 314, one or more central processing units (CPU)(s) 316 and a drive unit 318. The bus 302 enables the various components of the task assignment server 112 to communicate with one another, e.g., to transfer data and/or other types of information between the components. While only one bus 302 is shown in FIG. 3, more than one bus may be included.

The task interface 304 is adapted to receive tasks from clients (e.g., 104 in FIG. 1). The clients may use an application, web interface, or the like, to submit or otherwise send the tasks to the task assignment server 112. The feedback interface 306 is adapted to receive feedback from clients for which tasks have been performed. The clients may use an application, web interface, or the like, to submit or otherwise provide feedback to the task assignment server 112. Exemplary feedback which may be received from a client is discussed above. The database interface 308 provides the task assignment server 112 with access to one or more databases (e.g., databases 122 in FIG. 1), thereby enabling information and other types of data to be accessed or otherwise obtained by the task assignment server 112 from the database(s), and information and other types of data to be stored by the task assignment server 112 in the database(s). The database interface 308 can also enable the task assignment server 112 to modify data stored in the database(s), e.g., based on feedback received from the clients via the feedback interface 306. The queue interface 312 provides the task assignment server 112 with access to queues (e.g., 132 in FIG. 1) associated with worker resources 106, so that information about tasks assigned to workers can be stored in the queues. The task assignment server 112 may also utilize the queue interface 312 when reassigning tasks that had already been assigned. The worker resource interface 314 enables the task assignment server 112 to accept requests for tasks from worker resources, to help implement the "pull" model described above. The worker resource interface 314 can also be used to provide information about tasks directly to worker resources, or computers thereof, in certain embodiments that allow the queues to be circumvented in certain situations.

The memory 310 can store instructions which when executed cause one or more processors (e.g., CPU(s) 316) to perform methods described herein for intelligently distributing tasks received from clients among a plurality of worker resources. For example, the memory 310 can be used to store software and/or firmware that controls the task assignment server 112. Various different types of memory, including non-volatile and volatile memory can be included in the task assignment server 112. The drive unit 318, e.g., a hard drive, but not limited thereto, can also be used to store software that controls the task assignment server, but is not limited thereto. The memory 310 and the disk unit 318 can include a machine readable medium on which is stored one or more sets of executable instructions (e.g., apps) embodying one or more of the methodologies and/or functions described herein. In place of the drive unit 318, or in addition to the drive unit, the task assignment server 112 can include a solid-state storage device, such as those comprising flash memory or any form of non-volatile memory. The term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The CPU(s) 316 can be used to control the various other elements of the task assignment server 112, e.g., under control of software and/or firmware stored in the memory 310 and/or drive unit 318. Each CPU 316 can include, for example, a control unit, one or more processors, registers, and/or the like.

Certain embodiments described herein relate to a computer implemented system for intelligently distributing tasks received from clients among a plurality of worker resources. Such a system can include one or more databases adapted to store information about a plurality of worker resources and information about a plurality of clients. Additionally, the system can include a task assignment server, communicatively coupled to the one or more databases, and adapted to receive a plurality of tasks that are to be performed for the plurality of clients, access the stored information about the plurality of worker resources, access the stored information about the plurality of clients, and assign each of a majority of the tasks to one of the plurality of worker resources, in dependence on the information about the plurality of worker resources and in dependence on the information about the plurality of clients, so that the plurality of tasks are distributed among two or more of the plurality of worker resources. The system can further include a plurality of queues, communicatively coupled to the task assignment server, each of which is associated with one of the worker resources and each of which is adapted to store information about one or more tasks, assigned to the one of the worker resources associated with the queue, that have not yet been performed by the one of the worker resources.

As explained above, the task assignment server can assign a first subset of the plurality of tasks to a first subset of the plurality of worker resources without receiving a request for a said task from the first subset of the plurality of worker resources, and can assign a second subset of the plurality of tasks to a second subset of the plurality of worker resources in response to receiving requests for tasks from the second subset of the plurality of worker resources. For any particular one of the tasks, the task assignment server can determine whether the particular one of the tasks is assigned to one of the worker resources without receiving a request for a said task therefrom, or in response to receiving a request for a said task therefrom.

In certain embodiments, the information about the plurality of worker resources, stored in the one or more databases, includes availability information about an availability of each of the plurality of worker resources and capability information about one or more capabilities of each of the plurality of worker resources. This enables the task assignment server to assign tasks to one of the plurality of worker resources in dependence on the availability information and the capability information. The one or more databases can also be adapted to store relationship information about previously established relationships between specific combinations of the worker resources and the clients. This enable the task assignment server to assign at least some of the tasks to at least some of the plurality of worker resources also in dependence on the relationship information. The one or more databases can also be adapted to store inventory information about inventory available to the worker resources to perform the tasks. This enables the task assignment server to assign at least some of the tasks to at least some of the plurality of worker resources also in dependence on the inventory information. The inventory information can include present inventory information about inventory that is presently available to the worker resources to perform the tasks, and future inventory information about inventory that will be available to worker resources in the future to perform the tasks. In such an embodiment, the task assignment server can be adapted to delay assigning at least some of the tasks in dependence on the present inventory information and the future inventory information Each of the plurality of tasks can also have an associated completion deadline. In an embodiment, the task assignment server assigns a first subset of the plurality of tasks to a first subset of the plurality of worker resources, substantially immediately after receiving the first subset of the plurality of tasks, in dependence on the completion deadlines associated with the first subset of the plurality of tasks. The task assignment server can also delay assigning a second subset of the plurality of tasks to a second subset of the plurality of worker resources, in dependence on the completion deadlines associated with the second subset of the plurality of tasks, the present inventory information and the future inventory information.

In certain embodiments described herein, the task assignment server is adapted to calculate, for each of at least some of the plurality of worker resources, a probability of success that the worker resource will successfully perform one of the tasks for a particular one of the clients. In such embodiments, the task assignment server can assign the one of the tasks for the particular one of the clients to one of the worker resources in dependence on the calculated probabilities of success.

In certain embodiments described herein, the task assignment server is adapted to reassign one or more tasks already to assigned to clients so that information about one of the tasks for one of the clients is transferred from a first one of the queues associated with a first one of the worker resources to a second one of the queues associated with a second one of the worker resources. Such reassigning of tasks can be performed in dependence a quantity of tasks ahead of the one of the tasks included in the first one of the queues associated with the first one of the worker resources, the second one of the worker resources having a higher probability of success than the first one of the worker resources for successfully performing the one of the tasks for the one of the clients, and/or the second one of the worker resources already having a relationship with the one of the clients.

In certain embodiments described herein the task assignment server is adapted to assign each of a minority of the tasks to one of the plurality of worker resources in a random manner to thereby test out new combinations of the worker resources and the clients and establish new relationships therebetween. In such embodiments, the task assignment server can be adapted randomly select which of the tasks are to be assigned in a random manner.

Embodiments described herein are also directed to methods for intelligently distributing tasks received from clients among a plurality of worker resources. Such a method can include storing information about a plurality of worker resources and storing information about a plurality of clients. The method can also include receiving a plurality of tasks that are to be performed for the plurality of clients, and assigning each of a majority of the tasks to one of the plurality of worker resources, in dependence on the stored information about the plurality of worker resources and in dependence on the stored information about the plurality of clients, so that the plurality of tasks are distributed among two or more of the plurality of worker resources. The method can also include storing, in each of a plurality of queues, each of which is associated with one of the worker resources, information about one or more tasks, assigned to the one of the worker resources associated with the queue, that have not yet been performed by the one of the worker resources. Additionally, the method can include storing relationship information about previously established relationships between specific combinations of the worker resources and the clients, and the assigning can include assigning at least some of the tasks to at least some of the plurality of worker resources also in dependence on the relationship information. Further, the method can include storing inventory information about inventory available to the worker resources to perform the tasks, and the assigning can include assigning at least some of the tasks to at least some of the plurality of worker resources also in dependence on the inventory information.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a cathode ray tube (CRT) or liquid crystal display (LCD) monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:
1. A computer implemented system comprising:
one or more databases adapted to store information about a plurality of worker resources, information about a plurality of clients, and relationship information about previously established relationships between specific combinations of the worker resources and the clients;

memory that stores instructions to intelligently distribute tasks among the plurality of worker resources;

a task assignment server including one or more processor, communicatively coupled to the one or more databases, communicatively coupled to the memory that stores the instructions to intelligently distribute the tasks among the plurality of worker resources, and adapted to receive a plurality of tasks that are to be performed for the plurality of clients, the plurality of tasks including three or more tasks, access the stored information about the plurality of worker resources, access the stored information about the plurality of clients, access the stored relationship information about previously established relationships between specific combinations of the worker resources and the clients, the stored relationship information including feedback information that specifies whether or to what extent: (i) one or more of the worker resources successfully performed one or more tasks for one or more of the clients, (ii) one or more of the clients were satisfied with one or more tasks previously performed for the one or more of the clients by one or more of the worker resources, or (iii) one or more of the clients accepted or rejected results of one or more tasks previously performed for the one or more of the clients by one or more of the worker resources; and execute the instructions stored in the memory to intelligently distribute the tasks among the plurality of worker resources and thereby assign at least some of the tasks to at least some of the plurality of worker resources, in dependence on the stored information about the plurality of worker resources, in dependence on the stored information about the plurality of clients, and in dependence on the stored relationship information, so that two or more of the plurality of tasks are distributed among two or more of the plurality of worker resources; and a plurality of queues, communicatively coupled to the task assignment server, each of the queues associated with one of the worker resources, and each of the queues adapted to store information about one or more of the tasks, assigned to the one of the worker resources associated with the queue, that have not yet been performed by the one of the worker resources associated with the queue;

wherein the task assignment server assigns at least a first subset of the plurality of tasks to at least a first subset of the plurality of worker resources in response to receiving requests for tasks from the at least a first subset of the plurality of worker resources; and wherein the task assignment server implements load balancing to avoid overloading individual ones of the worker resources while also taking into account that the clients from which the tasks are received differ from one another, the worker resources to which the tasks may be assigned differ from one another, and that at least some of the clients and at least some of the worker resources have previously established relationships.

2. The system of claim 1, wherein the task assignment server assigns at least a second subset of the plurality of tasks to at least a second subset of the plurality of worker resources without receiving a request for a said task from the at least a second subset of the plurality of worker resources.

3. The system of claim 1, wherein: the task assignment server assigns a second subset of the plurality of tasks to a second subset of the plurality of worker resources without receiving requests for tasks from the second subset of the plurality of worker resources; and for a particular one of the tasks, the task assignment server determines whether the particular one of the tasks is assigned to one of the worker resources without receiving a request for a said task therefrom, or in response to receiving a request for a said task therefrom.

4. The system of claim 1, wherein:
the information about the plurality of worker resources, stored in the one or more databases, includes availability information about an availability of each of the plurality of worker resources and capability information about one or more capabilities of each of the plurality of worker resources; and
the task assignment server is adapted assign each of the majority of the tasks to one of the plurality of worker resources in dependence on the availability information and the capability information.

5. The system of claim 1, wherein:
the one or more databases is/are also adapted to store inventory information about inventory available to the worker resources to perform the tasks; the inventory information specifies information about physical products that are available for shipping to the clients;
the tasks involve selecting specific ones of the physical products from the inventory that are to be shipped to specific ones of the clients; and
the task assignment server is adapted to assign at least some of the tasks to at least some of the plurality of worker resources also in dependence on the inventory information.

6. The system of claim 5, wherein:
the inventory information includes present inventory information about inventory that is presently available to the worker resources to perform the tasks, and future inventory information about inventory that will be available to worker resources in the future to perform the tasks;
the future inventory information is based on inventory orders that have been made to at least one of replenish or expand the inventory available to the worker resources to perform the tasks, and item return information that is indicative of previously shipped physical products that are being returned because they were not accepted; and
the task assignment server is adapted to delay assigning at least some of the tasks in dependence on the present inventory information and the future inventory information.

7. The system of claim 1, wherein the task assignment server is adapted to assign each of a minority of the tasks to one of the plurality of worker resources in a random manner to thereby test out new combinations of the worker resources and the clients and establish new relationships therebetween.

8. The system of claim 1, wherein the stored relationship information about previously established relationships between specific combinations of the worker resources and the clients includes feedback information that specifies whether or to what extent one or more of the worker resources successfully performed tasks for one or more of the client.

9. The system of claim 1, wherein the stored relationship information about previously established relationships between specific combinations of the worker resources and the clients includes feedback information that specifies whether or to what extent one or more of the clients were satisfied with tasks previously performed for the one or more of the client by one or more of the worker resources.

10. The system of claim 1, wherein the stored relationship information about previously established relationships between specific combinations of the worker resources and the clients includes feedback information that specifies whether or to what extent one or more of the clients accepted or rejected results of tasks previously performed for the one or more of the client by one or more of the worker resources.

11. The system of claim 1; wherein the task assignment server includes a task interface that is adapted to receive tasks from the clients; the clients each include or have access to a first communication interface that enables each of the clients to send one or more tasks to the task assignment server; and the worker resources each include or have access to a second communication interface that enables each of the worker resources to access the queue associated with the worker resource and thereby access the information about one or more of the tasks stored in the queue associated with the worker resource.

12. The system of claim 1, wherein:
each of the clients comprises or has access to a client computing device;
each of the tasks comprises a computational task to be performed for the client under control and/or coordination of a service provider; and
each of the worker resources comprises or has to a server computing device and has computational bandwidth available to perform one or more tasks.

13. A computer implemented system comprising:
one or more databases adapted to store information about a plurality of worker resources, information about a plurality of clients, and inventory information about inventory available to the worker resources to perform tasks;
memory that stores instructions to intelligently distribute the tasks among the plurality of worker resources;
a task assignment server including one or more processor, communicatively coupled to the one or more databases, communicatively coupled to the memory that stores the instructions to intelligently distribute the tasks among the plurality of worker resources, and adapted to
receive a plurality of tasks that are to be performed for the plurality of clients, the plurality of tasks including three or more tasks,
access the stored information about the plurality of worker resources,
access the stored information about the plurality of clients,
access the stored inventory information, and
execute the instructions stored in the memory to intelligently distribute the tasks among the plurality of worker resources and thereby assign at least some of the tasks to at least some of the plurality of worker resources, in dependence on the stored information about the plurality of worker resources, in dependence on the stored information about the plurality of clients, and in dependence on the stored inventory information, so that two or more of the plurality of tasks are distributed among two or more of the plurality of worker resources; and
a plurality of queues, communicatively coupled to the task assignment server, each of the queues associated with one of the worker resources, and each of the queues adapted to store information about one or more of the tasks, assigned to the one of the worker resources associated with the queue, that have not yet been performed by the one of the worker resources associated with the queue;
wherein the inventory information includes present inventory information and future inventory information,
the present inventory information about inventory that is presently available to the worker resources to perform the tasks, and
the future inventory information about inventory that will be available to worker resources in the future to perform the tasks;
wherein each of the plurality of tasks has an associated completion deadline;
wherein the task assignment server assigns a first subset of the plurality of tasks to a first subset of the plurality of worker resources, substantially immediately after receiving the first subset of the plurality of tasks, in dependence on the completion deadlines associated with the first subset of the plurality of tasks;
wherein the task assignment server delays assigning a second subset of the plurality of tasks to a second subset of the plurality of worker resources, in dependence on the completion deadlines associated with the second subset of the plurality of tasks, the present inventory information and the future inventory information; and
wherein the task assignment server implements load balancing to avoid overloading individual ones of the worker resources while also taking into account that the clients from which the tasks are received differ from one another, the worker resources to which the tasks may be assigned differ from one another, and that delaying assigning of the second subset of the plurality of tasks increases a likelihood that the second subset of the plurality of tasks will be successfully performed.

14. The system of claim 1, wherein the task assignment server is adapted to:
calculate, for each of at least some of the plurality of worker resources, a probability of success that the worker resource will successfully perform one of the tasks for a particular one of the clients; and
assign the one of the tasks for the particular one of the clients to one of the worker resources in dependence on the calculated probabilities of success.

15. A computer implemented system comprising:
one or more databases adapted to store information about a plurality of worker resources, information about a plurality of clients, and inventory information about inventory available to the worker resources to perform tasks;
memory that stores instructions to intelligently distribute the tasks among the plurality of worker resources;
a task assignment server including one or more processor, communicatively coupled to the one or more databases, communicatively coupled to the memory that stores the instructions to intelligently distribute the tasks among the plurality of worker resources, and adapted to
receive a plurality of tasks that are to be performed for the plurality of clients, the plurality of tasks including three or more tasks,
access the stored information about the plurality of worker resources,
access the stored information about the plurality of clients,
access the stored inventory information;

execute the instructions stored in the memory to intelligently distribute the tasks among the plurality of worker resources and thereby assign at least some of the tasks to at least some of the plurality of worker resources, in dependence on the stored information about the plurality of worker resources, and in dependence on the stored information about the plurality of clients, so that two or more of the plurality of tasks are distributed among two or more of the plurality of worker resources; and a plurality of queues, communicatively coupled to the task assignment server, each of the queues associated with one of the worker resources, and each of the queues adapted to store information about one or more of the tasks, assigned to the one of the worker resources associated with the queue, that have not yet been performed by the one of the worker resources associated with the queue;

wherein each of the plurality of tasks has an associated completion deadline;

wherein the task assignment server is adapted to reassign one or more tasks already assigned to one or more of the worker resources so that information about one of the tasks for one of the clients is transferred from a first one of the queues associated with a first one of the worker resources to a second one of the queues associated with a second one of the worker resources; and wherein the task assignment server implements load balancing to avoid overloading individual ones of the worker resources while also taking into account that the clients from which the tasks are received differ from one another, the worker resources to which the tasks may be assigned differ from one another, and that reassigning one or more tasks already assigned to one or more of the worker resources increases a likelihood that the one or more tasks will be successfully performed by respective completion deadlines.

16. The system of claim 15, wherein the task assignment server reassigns the one of the tasks for the one of the clients, so that information about the one of the tasks is transferred from the first one of the queues associated with the first one of the worker resources to the second one of the queues associated with the second one of the worker resources, in dependence on one or more of the following:

a quantity of tasks ahead of the one of the tasks included in the first one of the queues associated with the first one of the worker resources, the second one of the worker resources having a higher probability of success than the first one of the worker resources for successfully performing the one of the tasks for the one of the clients, or the second one of the worker resources already having a relationship with the one of the clients.

17. A computer implemented system comprising:

one or more databases adapted to store information about a plurality of worker resources and information about a plurality of clients;

memory that stores instructions to intelligently distribute tasks among the plurality of worker resources;

a task assignment server including one or more processor, communicatively coupled to the one or more databases, communicatively coupled to the memory that stores the instructions to intelligently distribute the tasks among the plurality of worker resources, and adapted to receive a plurality of tasks that are to be performed for the plurality of clients, the plurality of tasks including three or more tasks, access the stored information about the plurality of worker resources, access the stored information about the plurality of clients, and execute the instructions stored in the memory to intelligently distribute the tasks among the plurality of worker resources and thereby assign at least some of the tasks to at least some of the plurality of worker resources, in dependence on the information about the plurality of worker resources and in dependence on the information about the plurality of clients, so that the plurality of tasks are distributed among two or more of the plurality of worker resources; and a plurality of queues, communicatively coupled to the task assignment server, each of the queues associated with one of the worker resources, and each of the queues adapted to store information about one or more of the tasks, assigned to the one of the worker resources associated with the queue, that have not yet been performed by the one of the worker resources;

wherein the task assignment server is adapted to assign each of a minority of the tasks to one of the plurality of worker resources in a random manner to thereby test out new combinations of the worker resources and the clients and establish new relationships therebetween; and wherein the task assignment server implements load balancing to avoid overloading individual ones of the worker resources while also taking into account that the clients from which the tasks are received differ from one another, the worker resources to which the tasks may be assigned differ from one another, and also establishing new relationships between specific combinations of the worker resources and the clients.

18. The system of claim 17, wherein the task assignment server is adapted randomly select which of the tasks are to be assigned in a random manner.

19. A computer implemented method comprising:

storing information about a plurality of worker resources;

storing information about a plurality of clients;

storing instructions to intelligently distribute tasks among the plurality of worker resources;

storing relationship information about the previously established relationships between specific combinations of the worker resources and the clients, the relationship information including feedback information that specifies whether or to what extent: (i) one or more of the worker resources successfully performed one or more tasks for one or more of the clients, (ii) one or more of the clients were satisfied with one or more tasks previously performed for the one or more of the clients by one or more of the worker resources, or (iii) one or more of the clients accepted or rejected results of one or more tasks previously performed for the one or more of the clients by one or more of the worker resources;

receiving a plurality of tasks that are to be performed for the plurality of clients, the plurality of tasks including three or more tasks;

assigning at least some of the tasks to at least some of the plurality of worker resources, in dependence on the stored information about the plurality of worker resources, in dependence on the stored information about the plurality of clients, and in dependence on the stored relationship information, so that two or more of the plurality of tasks are distributed among two or more of the plurality of worker resources; and storing, in each of a plurality of queues, each of which is associated with one of the worker resources, information about one or more of the tasks, assigned to the one of the worker resources associated with the queue, that have not yet been performed by the one of the worker resources;

wherein the assigning includes assigning at least a first subset of the plurality of tasks to at least a first subset of the plurality of worker resources in response to receiving requests for tasks from the at least a first subset of the plurality of worker resources; and wherein the receiving and assigning are performed by a task assignment server that includes one or more processor and that executes the instructions to intelligently distribute the tasks among the plurality of worker resources and thereby implements load balancing to avoid overloading individual ones of the worker resources while also taking into account that the clients from which the tasks are received differ from one another, and the worker resources to which the tasks may be assigned differ from one another.

20. The method of claim 19, wherein the assigning includes assigning at least a second subset of the plurality of tasks to at least a second subset of the plurality of worker resources without receiving a request for a said task from the at least a subset of the plurality of worker resources.

21. The method of claim 19, wherein:
the assigning includes assigning a second subset of the plurality of tasks to a second subset of the plurality of worker resources without receiving requests for a said task from the second subset of the plurality of worker resources;
for a particular one of the tasks, the assigning includes determining whether the particular one of the tasks will be assigned to one of the worker resources without receiving a request for a said task therefrom, or in response to receiving a request for a said task therefrom.

22. The method of claim 19, wherein:
the storing information about the plurality of worker resources includes storing availability information about an availability of each of the plurality of worker resources; and storing capability information about one or more capabilities of each of the plurality of worker resources; and
the assigning includes assigning each of the majority of the tasks to one of the plurality of worker resources in dependence on the availability information and the capability information.

23. The method of claim 19, further comprising:
storing inventory information about inventory available to the worker resources to perform the tasks; wherein the inventory information specifies information about physical products that are available for shipping to the clients;
wherein the tasks involve selecting specific ones of the physical products from the inventory that are to be shipped to specific ones of the clients; and
wherein the assigning includes assigning at least some of the tasks to at least some of the plurality of worker resources also in dependence on the inventory information.

24. The method of claim 23, wherein:
the storing inventory information includes storing present inventory information about inventory that is presently available to the worker resources to perform the tasks, and future inventory information about inventory that will be available to worker resources in the future to perform the tasks;
the future inventory information is based on inventory orders that have been made to at least one of replenish or expand the inventory available to the worker resources to perform the tasks, and item return information that is indicative of previously shipped physical products that are being returned because they were not accepted; and the assigning includes delaying assigning at least some of the tasks in dependence on the present inventory information and the future inventory information.

25. The method of claim 24, wherein:
each of the plurality of tasks has an associated completion deadline; and the assigning includes assigning a first subset of the plurality of tasks to a first subset of the plurality of worker resources, substantially immediately after receiving the first subset of the plurality of tasks, in dependence on the completion deadlines associated with the first subset of the plurality of tasks; and
delaying assigning a second subset of the plurality of tasks to a second subset of the plurality of worker resources, in dependence on the completion deadlines associated with the second subset of the plurality of tasks, the present inventory information and the future inventory information.

26. The method of claim 19, wherein the assigning includes:
calculating, for each of at least some of the plurality of worker resources, a probability of success that the worker resource will successfully perform one of the tasks for a particular one of the clients; and
assigning the one of the tasks for the particular one of the dents to one of the worker resources in dependence on the calculated probabilities of success.

27. The method of claim 19, further comprising:
reassigning one or more tasks already to assigned to dents so that information about one of the tasks for one of the clients is transferred from a first one of the queues associated with a first one of the worker resources to a second one of the queues associated with a second one of the worker resources.

28. The method of claim 27, wherein the reassigning tasks includes reassigning one of the tasks for the one of the so that information about the one of the tasks is transferred from the first one of the queues associated with the first one of the worker resources to the second one of the queues associated with the second one of the worker resources, in dependence on one or more of the following:
a quantity of tasks ahead of the one of the tasks included in the first one of the queues associated with the first one of the worker resources, the second one of the worker resources having a higher probability of success than the first one of the worker resources for successfully performing the one of the tasks for the one of the clients, or the second one of the worker resources already having a relationship with the one of the clients.

29. The method of claim 19, further comprising assigning each of a minority of the tasks to one of the plurality of worker resources in a random manner to thereby test out new combinations of the worker resources and the clients and establish new relationships therebetween.

30. The method of claim 29, further comprising randomly selecting which of the tasks are to be assigned in a random manner.

31. The method of claim 19, wherein
the task assignment server includes a task interface that is adapted to receive tasks from the clients; the clients each include or have access to a first communication interface that enables each of the clients to send one or more tasks to the task assignment server; and
the worker resources each include or have access to a second communication interface that enables each of the worker resources to access the queue associated with the worker resource and thereby access the information about one or more of the tasks stored in the queue associated with the worker resource.

32. The method of claim 19, wherein:
each of the clients comprises or has access to a client computing device; each of the tasks comprises a computational task to be performed for the client under control and/or coordination of a service provider; and
each of the worker resources comprises or has to a server computing device and has computational bandwidth available to perform one or more tasks.

33. One or more non-transitory processor readable storage devices having instructions encoded thereon which when executed cause one or more processors to perform a method comprising:
operations to intelligently distribute tasks among a plurality of worker resources, the operations comprising:
receiving a plurality of tasks that are to be performed for a plurality of clients, the plurality of tasks including three or more tasks, and the plurality of tasks relating to selecting specific ones of the physical products from the inventory that are to be shipped to specific ones of the clients; and
assigning at least some of the tasks to at least some of the plurality of worker resources, in dependence on stored information about the plurality of worker resources, stored information about the plurality of clients, and stored relationship information about previously established relationships between specific combinations of the worker resources and the clients, so that two or more of the plurality of tasks are distributed among two or more of the plurality of worker resources; and
assigning each of a minority of the tasks to one or more of the plurality of worker resources in a random manner to thereby test out new combinations of the worker resources and the clients and establish new relationships therebetween;
wherein the receiving and assigning are performed by a task assignment server that includes one or more processor and that executes the instructions and thereby implements load balancing to avoid overloading individual ones of the worker resources while also taking into account that the clients from which the tasks are received differ from one another, and the worker resources to which the tasks may be assigned differ from one another, and that at least some of the clients and at least some of the worker resources have previously established relationships.

34. The one or more non-transitory processor readable storage devices of claim 33, wherein the method further comprises:
storing, in each of a plurality of queues, each of which is associated with one of the worker resources, information about one or more tasks, assigned to the one of the worker resources associated with the queue, that have not yet been performed by the one of the worker resources.

35. The one or more non-transitory processor readable storage device of claim 33, wherein the relationship information about previously established relationships between specific combinations of the worker resources and the clients including feedback information that specifies whether or to what extent: (i) one or more of the worker resources successfully performed tasks for one or more of the client, (ii) one or more of the clients were satisfied with tasks previously performed for the one or more of the client by one or more of the worker resources, or (iii) one or more of the clients accepted or rejected results of tasks previously performed for the one or more of the client by one or more of the worker resources.

36. The one or more non-transitory processor readable storage device of claim 33, wherein;
the assigning is also in dependence on inventory information;
the inventory information includes present inventory information about inventory that is presently available to the worker resources to perform the tasks, and future inventory information about inventory that will be available to worker resources in the future to perform the tasks;
the future inventory information is based on inventory orders that have been made to at least one of replenish or expand the inventory available to the worker resources to perform the tasks, and item return information that is indicative of previously shipped physical products that are being returned because they were not accepted; and the assigning includes delaying assigning at least some of the tasks in dependence on the present inventory information and the future inventory information.

37. The one or more non-transitory processor readable storage device of claim 36, wherein:
each of the plurality of tasks has an associated completion deadline; and the assigning includes assigning a first subset of the plurality of tasks to a first subset of the plurality of worker resources, substantially immediately after receiving the first subset of the plurality of tasks; in dependence on the completion deadlines associated with the first subset of the plurality of tasks; and
delaying assigning a second subset of the plurality of tasks to a second subset of the plurality of worker resources, in dependence on the completion deadlines associated with the second subset of the plurality of tasks, the present inventory information and the future inventory information.

38. The one or more non-transitory processor readable storage device of claim 33, wherein:
the stored information about the plurality of worker resources includes availability information about an availability of each of the plurality of worker resources and capability information about one or more capabilities of each of the plurality of worker resources; and
the assigning includes assigning each of the majority of the tasks to one of the plurality of worker resources in dependence on the availability information and the capability information.

* * * * *